(No Model.)
S. WHITLOCK.
GEARING FOR PRINTING PRESSES.
No. 332,576. Patented Dec. 15, 1885.
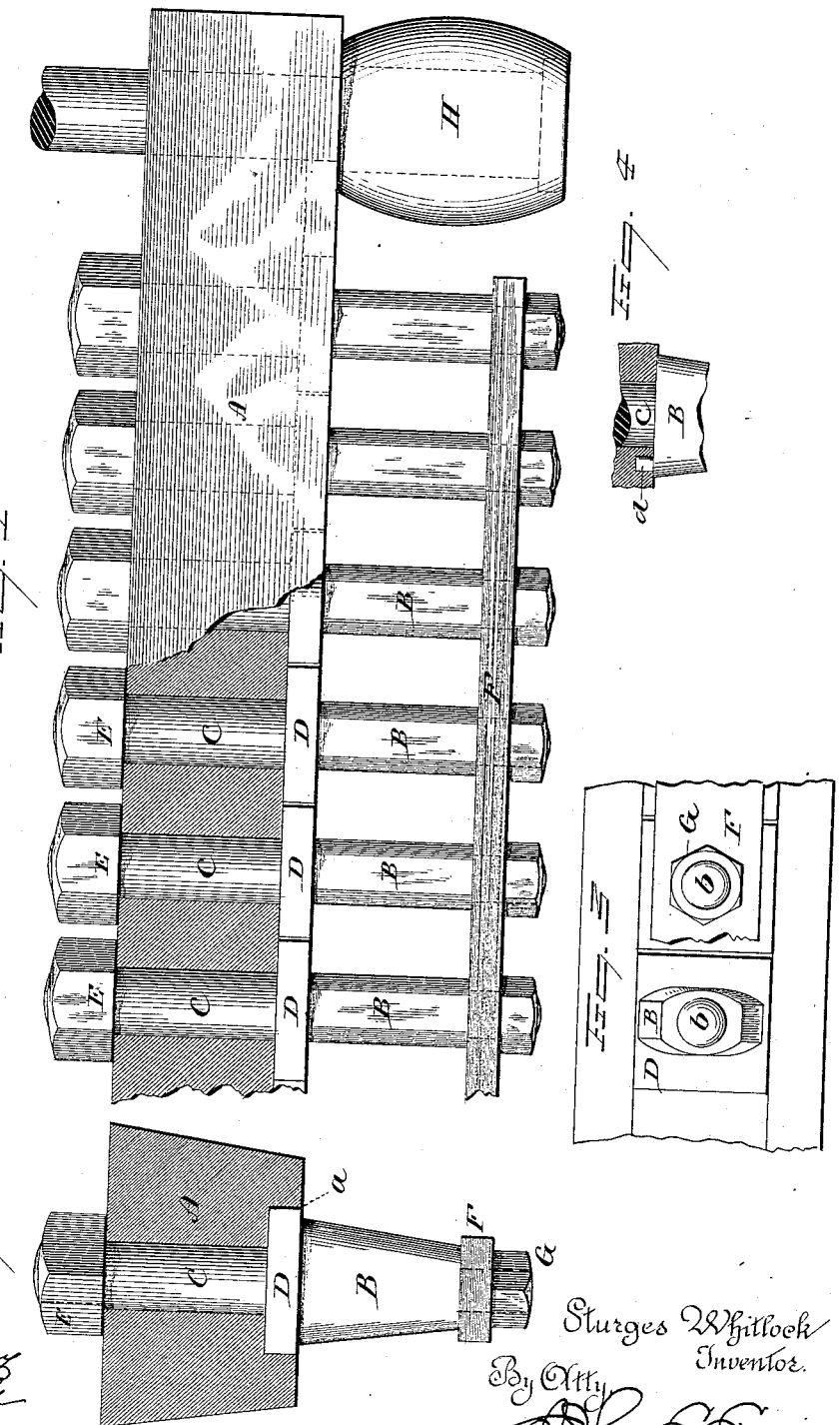
Witnesses
Fred C. Earle
Sturges Whitlock
Inventor.
By Atty

UNITED STATES PATENT OFFICE.

STURGES WHITLOCK, OF BIRMINGHAM, CONNECTICUT.

GEARING FOR PRINTING-PRESSES.

SPECIFICATION forming part of Letters Patent No. 332,576, dated December 15, 1885.

Application filed June 15, 1885. Serial No. 168,720. (No model.)

*To all whom it may concern:*

Be it known that I, STURGES WHITLOCK, of Birmingham, in the county of New Haven and State of Connecticut, have invented a new Improvement in Printing-Presses; and I do hereby declare the following, when taken in connection with accompanying drawings and the letters of reference marked thereon, to be a full, clear, and exact description of the same, and which said drawings constitute part of this specification, and represent, in—

Figure 1, a top view showing a portion of the rack-bar in horizontal section; Fig. 2, a section cutting at right angles to Fig. 1; Fig. 3, a front view showing the end of one tooth with the outer bar broken away and a second tooth with the bar applied; Fig. 4, a modification of the connection between the base of the tooth and the face of the rack-bar.

This invention relates to an improvement in that class of printing-presses in which the type-bed receives a reciprocating motion, and in which the bed is so reciprocated by the movement generally known as "Napier Movement"—that is to say, a rack so arranged in connection with the bed that a revolving pinion working into the said rack upon, say, the upper side, causes the rack with the bed to move in one direction until the end of the rack is reached, then the pinion is thrown to the opposite or under side of the rack, and so that the continued movement of the pinion working in the opposite side of the rack will throw the bed in the reverse direction until the other end of the rack is reached, when the pinion will again return to the upper side of the rack, and working therein return the bed. Thus the pinion maintaining a constant revolution will impart reciprocating movement according to the length of the rack. The teeth of the rack are necessarily subjected to a great strain and wear, and if the teeth be made a permanent part of the base or body of the rack the expense of repair is very great, the teeth being liable to break as well as to wear, and thereby necessitate replacing.

The object of my invention is the construction of a rack with independent detachable teeth; and the invention consists in the construction of the rack, as more fully hereinafter described, and particularly recited in the claims.

In illustrating my invention I show only a portion of the rack. Its application to the bed of the machine is too well known, as also the arrangement of the pinion to work in the teeth, to require particular illustration or description in this specification.

A represents the base or body of the rack, which consists of a longitudinal bar to be attached to or made a part of the bed of the machine. On the face of the base or bar A a longitudinal groove, *a*, is cut, broader than the extreme depth of the teeth of the rack, and at equidistant points transversely through the bar in the groove holes are bored corresponding to the position of the teeth to be set, the hole being adapted to receive the shank of the tooth. The tooth consists of the body B, which is in the usual shape for the body of the tooth in this class of racks, and, as seen in Fig. 3, the thickness of the tooth being equal throughout, the depth gradually contracting from the bar outward, so as to give an inclination of the top and bottom, as seen in Fig. 2, to adapt it to the different inclinations of the pinion as it works upon one side or the other. The tooth is constructed with a shank, C, adapted to pass through the hole in the bar A. Between the teeth and the shank a collar, D, is formed, preferably square, or so as to take a bearing in the groove *a* in the bar, so that when resting therein rotation of the tooth is impossible, and also so that the teeth will be located by their collars in their proper relation or position to each other. The shank extends through the bar, and at the rear is provided with a nut, E, by which the tooth is secured in the bar. At the outer end the teeth are reduced to form a stud, *b*, upon which a bar, F, is arranged, the said bar being perforated corresponding to the studs *b*, and then outside the bar F a nut, G, is applied to the correspondingly screw-threaded end of the studs *b*, and as indicated in the drawings. At each end of the rack the usual stud, H, is arranged to engage the pinion and throw it from the upper to the lower side of the rack at one end and lower to the upper side at the opposite end in the usual manner. This stud H may be secured to the bar in the usual manner, preferably as indicated in Fig. 1.

The bar F may be omitted. In that case the stud on the end of the tooth will also be omitted; but I prefer to employ the bar, as it unites and greatly strengthens the teeth.

While I prefer to construct the bar with a longitudinal groove and the teeth with a corresponding collar, whereby the teeth are located and supported in their proper relative position to each other and to the rack, and prevented from rotation on their own axis, such rotation may be prevented and the teeth supported by any suitable projection at the base end of the tooth—say as seen in Fig. 4—by providing the base end of the tooth with a steady-pin, $d$, which will enter a corresponding recess in the faces of the rack. While this will accomplish the object of the groove and collars, I prefer the groove and collars as before described; but I do not wish to be understood as limiting my invention thereto.

I claim—

1. The herein-described improvement in rack for the Napier movement of a printing-press, consisting of the base or bar transversely pierced with holes corresponding to the position of the several teeth, combined with teeth to form the rack, each tooth consisting of a body of a shape adapted to the teeth of the pinion to work thereon, and also constructed with a shank to pass through the corresponding hole in the bar, the face of the rack and base of the teeth constructed to engage each other, whereby rotation of a tooth upon its own axis is prevented and a nut applied to the shank to secure the teeth in the rack, substantially as described.

2. The herein-described improvement in rack for the Napier movement of a printing-press, consisting of the base or bar transversely pierced with holes corresponding to the position of the several teeth, combined with teeth to form the rack, each tooth consisting of a body of a shape adapted to the teeth of the pinion to work thereon, and also constructed with a shank to pass through the corresponding hole in the bar, the face of the rack and base of the teeth constructed to engage each other, whereby rotation of a tooth upon its own axis is prevented, and a nut applied to the shank to secure the tooth in the rack, the outer end of the teeth constructed with a stud, correspondingly-pierced bar arranged upon the studs of the several teeth, and nuts upon the studs outside the said bar, substantially as described.

3. The herein-described improvement in rack for the Napier movement of a printing-press, consisting of the rack base or bar constructed with a longitudinal groove, with holes transversely through the bar in said groove corresponding to the position of the respective teeth, the teeth constructed separate from each other, each composed of a body of a shape adapted to the teeth of the pinion to work thereon, and with a shank adapted to pass through the corresponding hole in the bar, and also with a collar adapted to set in said groove and locate the teeth with relation to each other and to the bar, and provided with a nut whereby the said teeth are secured to the bar, substantially as described.

4. The herein-described improvement in rack for the Napier movement of a printing-press, consisting of the rack base or bar constructed with a longitudinal groove, with holes transversely through the bar in said groove corresponding to the position of the respective teeth, the teeth constructed separate from each other, each composed of a body of a shape adapted to the teeth of the pinion to work thereon, and with a shank adapted to pass through the corresponding hole in the bar, and also with a collar adapted to set in said groove and locate the teeth with relation to each other and to the bar, and provided with a nut whereby the said teeth are secured to the bar, the outer ends of the teeth constructed with a stud, a correspondingly-perforated bar set upon said studs, with nuts upon said studs outside said bar, whereby the outer ends of the said teeth are connected, substantially as described.

STURGES WHITLOCK.

Witnesses:
LILLIAN D. KELSEY,
JOHN E. EARLE.